(12) United States Patent
Yoshida

(10) Patent No.: US 9,229,663 B2
(45) Date of Patent: Jan. 5, 2016

(54) INFORMATION PROCESSING APPARATUS AND METHOD FOR SELECTIVE PRIORITIZATION OF JOBS

(75) Inventor: Tomoki Yoshida, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 65 days.

(21) Appl. No.: 13/366,471

(22) Filed: Feb. 6, 2012

(65) Prior Publication Data

US 2012/0206763 A1 Aug. 16, 2012

(30) Foreign Application Priority Data

Feb. 15, 2011 (JP) .................................. 2011-029907
Jan. 12, 2012 (JP) .................................. 2012-004425

(51) Int. Cl.
*G06F 3/12* (2006.01)
*G06F 21/00* (2013.01)

(52) U.S. Cl.
CPC ............ *G06F 3/1204* (2013.01); *G06F 3/1222* (2013.01); *G06F 3/1238* (2013.01); *G06F 3/1263* (2013.01); *G06F 3/1288* (2013.01); *G06F 21/00* (2013.01); *G06F 3/1267* (2013.01)

(58) Field of Classification Search
CPC ... G06F 3/1222; G06F 3/1238; G06F 3/1263; G06F 3/1204; G06F 3/1288; G06F 21/00; G06F 3/1267
USPC ........................................................ 358/1.15
See application file for complete search history.

(56) References Cited

U.S. PATENT DOCUMENTS

| 6,363,472 | B1 * | 3/2002 | Linnermark ..................... 712/36 |
| 7,633,659 | B2 * | 12/2009 | Uotani et al. .................. 358/527 |
| 8,432,569 | B2 * | 4/2013 | Yago ............................ 358/1.15 |
| 2003/0020943 | A1 * | 1/2003 | Kizaki .......................... 358/1.14 |
| 2004/0263870 | A1 * | 12/2004 | Itoh et al. ....................... 358/1.1 |
| 2005/0052679 | A1 * | 3/2005 | Green et al. .................. 358/1.14 |
| 2005/0137885 | A1 * | 6/2005 | Nohgawa et al. ................. 705/1 |
| 2006/0050307 | A1 * | 3/2006 | Koike .......................... 358/1.15 |
| 2006/0061823 | A1 * | 3/2006 | Riesel et al. .................. 358/1.16 |
| 2006/0233580 | A1 * | 10/2006 | Ueda et al. ...................... 400/62 |
| 2006/0285159 | A1 * | 12/2006 | Frankel ........................ 358/1.16 |
| 2007/0046995 | A1 * | 3/2007 | Toda ............................ 358/1.16 |
| 2007/0058191 | A1 * | 3/2007 | Harigae ....................... 358/1.15 |
| 2007/0162716 | A1 * | 7/2007 | Yagisawa et al. ............. 711/162 |
| 2009/0015866 | A1 * | 1/2009 | Iwamoto ...................... 358/1.15 |
| 2009/0225364 | A1 * | 9/2009 | Sato ............................. 358/1.15 |
| 2009/0287526 | A1 * | 11/2009 | Ramkumar et al. .............. 705/9 |
| 2010/0153124 | A1 * | 6/2010 | Dasari et al. ................... 705/1.1 |
| 2010/0188700 | A1 * | 7/2010 | Fujimori et al. ............. 358/1.15 |
| 2010/0271663 | A1 * | 10/2010 | Kadota ........................ 358/1.15 |
| 2011/0032565 | A1 * | 2/2011 | Akimoto et al. ............. 358/1.15 |
| 2011/0087731 | A1 * | 4/2011 | Wong et al. ................... 709/204 |

FOREIGN PATENT DOCUMENTS

| JP | 2006-260023 A | 9/2006 |
| JP | 2008217718 A | 9/2008 |

\* cited by examiner

*Primary Examiner* — Peter K Huntsinger
*Assistant Examiner* — Edwin S Leland, III
(74) *Attorney, Agent, or Firm* — Hamre, Dickey & Pierce, P.L.C.

(57) ABSTRACT

According to an embodiment, an information processing apparatus includes: an acquiring unit that acquires a job list in which a job, authorization information expressing authorization over a process of a job, and level of priority of the job are associated with one another; and an output unit that outputs preferentially a job with high level of the priority over a job with low level of the priority.

12 Claims, 9 Drawing Sheets

| SETTING SCREEN | | | | | | | |
|---|---|---|---|---|---|---|---|
| USER ID | PRINTING AUTHORIZATION | | DELETION AUTHORIZATION | | PRIORITY | | |
| A1 | ○ | ▽ | ○ | ▽ | HIGHEST | ▽ | |
| A2 | ○ | ▽ | × | ▽ | HIGH | ▽ | |
| A3 | ○ | ▽ | ○ | ▽ | MEDIUM | ▽ | |
| A4 | × | ▽ | × | ▽ | | ▽ | |
| A5 | × | ▽ | ○ | ▽ | | ▽ | |

PRINT   CANCEL

FIG.3

| AUTHORIZATION ID | AUTHORIZATION |
|---:|---|
| 1 | PRINTING ALLOWED |
| 2 | DELETION ALLOWED |
| 3 | PRINTING AND DELETION ALLOWED |
| 4 | NOT ALLOWED |

FIG.4

| USER ID | USER NAME | USER ID | USER INFORMATION |
|---:|---|---:|---|
| A1 | USER A1 | G1 | DIVISION CHIEF |
| A2 | USER A2 | G2 | SECTION CHIEF |
| A3 | USER A3 | G1 | CHIEF EXECUTIVE |

FIG.5

| USER ID | PRINT JOB ID | AUTHORIZATION ID | PRIORITY |
|---:|---:|---:|---|
| A1 | 1 | 1 | HIGH |
| A1 | 2 | 1 | LOW |
| A2 | 1 | 1 | HIGH |

FIG.6

| PRINT JOB ID | JOB NAME | PRINT DATA ATTRIBUTE | INPUT USER ID | PERIOD OF VALIDITY | INPUT TIME |
|---:|---|---|---|---|---|
| 1 | Job 1 | txt | A1 | 2010/1/1 | t1 |
| 2 | Job 2 | pdf | A1 | 2010/2/1 | t2 |
| 3 | Job 3 | doc | A2 | 2010/2/1 | t3 |

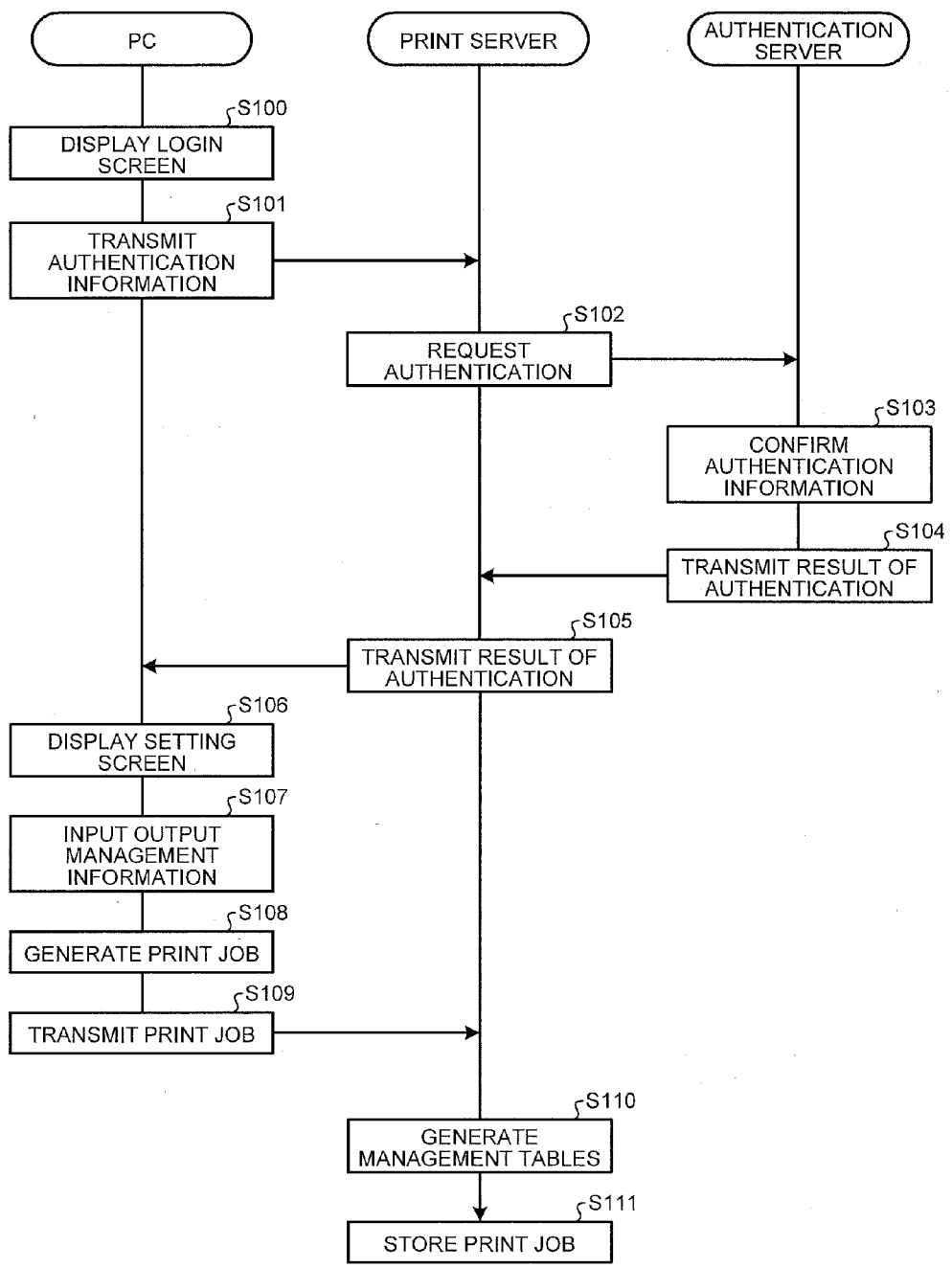

FIG.10

```
┌─────────────────────────────────┐
│         LOGIN SCREEN            │
│                                 │
│  LOGIN NAME                     │
│  ┌──────────┐                   │
│  │          │                   │
│  └──────────┘                   │
│  PASSWORD                       │
│  ┌──────────┐                   │
│  │          │                   │
│  └──────────┘        ┌───────┐  │
│                      │ LOGIN │  │
│                      └───────┘  │
└─────────────────────────────────┘
```

FIG.11

| SETTING SCREEN | | | |
|---|---|---|---|
| USER ID | PRINTING AUTHORIZATION | DELETION AUTHORIZATION | PRIORITY |
| A1 | ○ ▽ | ○ ▽ | HIGHEST ▽ |
| A2 | ○ ▽ | × ▽ | HIGH ▽ |
| A3 | ○ ▽ | ○ ▽ | MEDIUM ▽ |
| A4 | × ▽ | × ▽ | ▽ |
| A5 | × ▽ | ○ ▽ | ▽ |

[PRINT] [CANCEL]

FIG.13

| A1 | JOB LIST | | PRINTING SETTINGS | | |
|---|---|---|---|---|---|
| JOB NAME | PRINTING AUTHORIZATION | DELETION AUTHORIZATION | NUMBER OF COPIES | TWO-SIDED | COLOR |
| Job 1 | ○ | ○ | 1 | ○ | ○ |
| Job 2 | ○ | × | 0 | × | × |
| | PRINT | DELETE | CANCEL | | |

FIG.14

| A1 | JOB LIST |
|---|---|
| JOB NAME | PRIORITY |
| Job 1 | HIGHEST |
| Job 2 | HIGH |
| Job 3 | MEDIUM |
| Job 4 | MEDIUM |
| PRINT | CANCEL |

INFORMATION PROCESSING APPARATUS AND METHOD FOR SELECTIVE PRIORITIZATION OF JOBS

CROSS-REFERENCE TO RELATED APPLICATIONS

The present application claims priority to and incorporates by reference the entire contents of Japanese Patent Application No. 2011-029907 filed in Japan on Feb. 15, 2011 and Japanese Patent Application No. 2012-004425 filed in Japan on Jan. 12, 2012.

BACKGROUND OF THE INVENTION

1. Field of the Invention

The present invention relates to an information processing apparatus, an information processing method, and a computer program product.

2. Description of the Related Art

As networks such as a local area network (LAN) have become widespread in recent years, the shared use of print output devices such as printers, copiers, and multifunction peripherals by multiple users has become popular. For instance, one printer connects to a personal computer (PC) used by each of the multiple users via a network; and the printer prints out a document in response to a print output command received from each PC. At that time, the printer prints out the documents for the users in a mixed manner. If a document contains highly-confidential information, there is a possibility of information leakage; therefore, it is necessary to take information security measures.

For example, Japanese Patent Application Laid-open No. 2006-260023 discloses a printing system for information security measures in which, during group printing from a client device, a print job which has a header with multiple user IDs or a group ID added thereto is transmitted to a print server; the print server stores and manages the received print job corresponding to the user IDs or group ID; and if a user ID which is authenticated during user authentication performed by an authenticating device matches the user IDs or group ID, printing of the print job is allowed.

Furthermore, Japanese Patent Application Laid-open No. 2008-217718 discloses an authentication print control device in which print job information is stored in association with a user; and after authentication is received from the user, a print job is output to a printing unit in accordance with the print job information which is associated with the user in response to a print command received from the user.

In the above-described Patent document, when a print job is transmitted on the user side, authentication of the user ID is performed; a transmitted print job is stored for each authenticated user; and a print output device again performs authentication on the user ID. Thus, printing can be performed by only the user who can receive a printed document so that it is possible for the user to definitely receive the document and so that it is possible to prevent the user from forgetting to pick up the document. Thus, it is possible to improve information security.

However, as a user who can receive a printed document is merely designated, a user cannot actively involve himself/herself in, for example, deleting a document to be printed. Furthermore, if there are multiple documents to be printed, there is a possibility that printing of an urgent document is held up because the order of priority for printing is not specified.

The present invention has been made in consideration of the foregoing. There is need of an information processing apparatus, an information processing method, and a computer program product by which information security during output of jobs can be enhanced and the jobs can be output in accordance with the priority.

SUMMARY OF THE INVENTION

It is an object of the present invention to at least partially solve the problems in the conventional technology.

According to an embodiment, an information processing apparatus includes: an acquiring unit that acquires a job list in which a job, authorization information expressing authorization over a process of a job, and level of priority of the job are associated with one another; and an output unit that outputs, out of the jobs, a job with high level of the priority preferentially over a job with low level of the priority.

According to another embodiment, an information processing method in an information processing apparatus includes: acquiring a job list in which a job, authorization information expressing authorization over a process of a job, and a level of priority of the job are associated with one another; and outputting, out of the jobs, a job with high level of the priority preferentially over a job with low level of the priority.

According to still another embodiment, a computer program product includes a non-transitory computer-readable medium having computer-readable program codes for an information processing apparatus, the program codes when executed causing a computer to execute: acquiring a job list in which a job, authorization information expressing authorization over a process of a job, and a level of priority of the job are associated with one another; and outputting, out of the jobs, a job with high level of the priority preferentially over a job with low level of the priority.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a table that illustrates an example of the data structure of an authorization table;

FIG. 4 is a table that illustrates an example of the data structure of a user table;

FIG. 5 is a table that illustrates an example of the data structure of a user-job association table;

FIG. 6 is a table that illustrates an example of the data structure of a job table;

FIG. 9 is a flowchart that illustrates an exemplary operation to transmit a print job to a print server;

FIG. 10 is a diagram that illustrates an exemplary login screen;

FIG. 11 is a diagram that illustrates an exemplary setting screen;

FIG. 13 is a diagram that illustrates an example of a displayed job list;

FIG. 14 is a diagram that illustrates another example of a displayed job list.

DETAILED DESCRIPTION OF THE PREFERRED EMBODIMENTS

Figure 1:
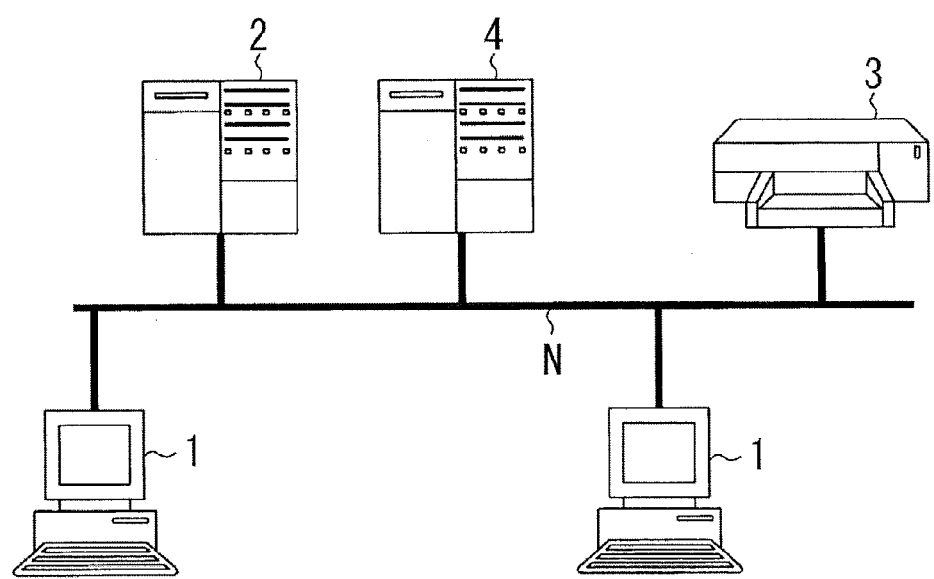
FIG. 1 is a diagram that illustrates an exemplary configuration of an image forming system according to a present embodiment.

An explanation is given below of the present embodiment with reference to the accompanying drawings. In the following, an explanation is given of an exemplary image forming system that includes an image forming apparatus that outputs print jobs; however, applicable apparatuses and systems are not limited to these. For example, the same technique can be applied to an information processing apparatus and an information processing system for outputting jobs other than print jobs. FIG. 1 is a diagram that illustrates an exemplary configuration of an image forming system according to the present embodiment. The image forming system includes PCs 1, a print server 2, an image forming apparatus 3, and an authentication server 4, which are connected to one another via a network N such as a LAN so that they can communicate with each another.

The PC 1 uses an application included therein to transmit electronic data to the print server 2. The electronic data is for example document data generated by a user or document data stored in its memory area. When electronic data is to be transmitted to the print server 2, the electronic data is converted into print data that can be printed by for example the image forming apparatus 3; and the print job, which contains the print data, information about the print settings of the print data, and the like, is transmitted to the print server 2. The electronic data may be transmitted as electronic data without being converted into print data, or the like. An explanation is given of a case where the PC 1 is a device that transmits electronic data according to the present embodiment; however, a device that transmits electronic data is not limited to the PC 1. For example, a personal digital assistant (PDA) may be used if it is an information processing apparatus that has a function for transmitting electronic data to the print server 2.

The print server 2 is a server that stores therein print jobs transmitted from the PC 1 and manages them. The print server 2 has a function of transmitting a print job which is stored therein and managed thereby in response to a request received from the image forming apparatus 3, or the like. The print server 2 may have the function of converting electronic data into print data. For example, if electronic data is transmitted from the PC 1, the print server 2 converts the electronic data into print data and manages a print job that contains the converted print data.

The image forming apparatus 3 is, for example, a multifunction peripheral within one chassis that performs scanning, printing, copying, FAX transmitting/receiving functions, or the like. An apparatus that has any one of the functions may be used as the image forming apparatus 3. The image forming apparatus 3 acquires user authentication information (information for identifying a user) such as a user ID which is input by a user, and requests the authentication server 4 to authenticate the user authentication information. Furthermore, the image forming apparatus 3 acquires a print job from the print server 2.

The authentication server 4 uses the received user authentication information and the user authentication information stored therein to perform an authentication process and then transmits the result of the authentication.

In the present embodiment, an explanation is given by using the image forming apparatus 3, the print server 2, and the authentication server 4 as separate devices. A configuration may be such that the image forming apparatus 3 has the function of the print server 2 or the authentication server 4. If the function of the print server 2 is incorporated in the image forming apparatus 3, the print server 2 does not need to be included in the image forming system. If the function of the authentication server 4 is incorporated in the image forming apparatus 3, the authentication server 4 does not need to be included in the image forming system.

Figure 2:
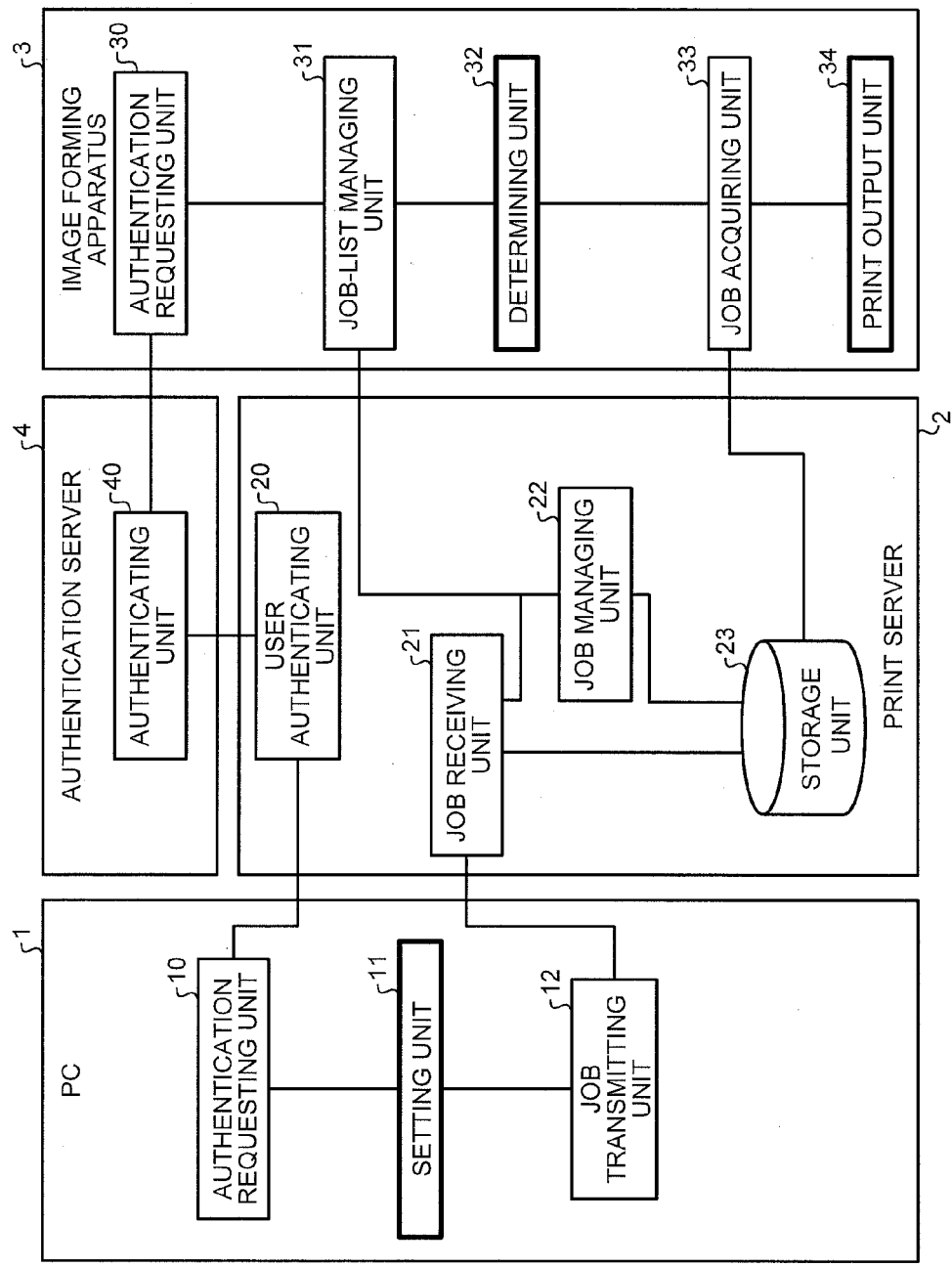
FIG. 2 is a block diagram that illustrates an exemplary functional configuration of the image forming system.

FIG. 2 is a block diagram that illustrates an exemplary functional configuration of the image forming system. The PC 1 includes an authentication requesting unit 10, a setting unit 11, and a job transmitting unit 12.

The authentication requesting unit 10 performs an operation to input user authentication information which is necessary when print data is transmitted to the print server 2, and performs an operation to request authentication.

The setting unit 11 sets output management information on the basis of data input by the user. The output management information includes authorization information, management information, priority information, and the like. The authorization information is information in which the authorization for processing using print jobs is set in association with a user. The management information is information that indicates the period of validity during which a print can be output, the number of times printing can be performed, and the like. The priority information is information that indicates an order of priority for printouts.

The job transmitting unit 12 generates and transmits a print job to the print server 2. A print job includes print data and job information. The print data means target data to be printed out. The job information includes attribute information, such as print settings or user information (user name, user ID, password, and the like), output management information, and the like.

Next, an explanation is given of the configuration of the print server 2. The print server 2 includes a user authenticating unit 20, a job receiving unit 21, a job managing unit 22, and a storage unit 23.

The user authenticating unit 20 transmits user authentication information which is received from the authentication requesting unit 10 of the PC 1 to the authentication server 4 and requests the authentication server 4 to authenticate the user authentication information.

The job receiving unit 21 receives a print job from the job transmitting unit 12 of the PC 1. The job receiving unit 21 performs a process for assigning a print job ID which identifies a print job to the received print job and for storing it in the job managing unit 22 and the storage unit 23.

The job managing unit 22 receives job information from the job receiving unit 21 and then generates a job table in which a print job ID is associated with the job information. The job managing unit 22 refers to a pre-set authorization table and user table so as to generate a user-job association table.

FIG. 3 is a table that illustrates an example of the data structure of the authorization table. As illustrated in FIG. 3, the authorization table contains the authorization granted to a user for a printing process and contains an authorization ID that is information for identifying the authorization.

FIG. 4 is a table that illustrates an example of the data structure of the user table. As illustrated in FIG. 4, the user table contains a user ID, user name, group ID, and user information. The user ID is information for identifying a user. The group ID is information for identifying a group into which multiple users are grouped. The user information is information, such as the user's position within a company.

FIG. 5 is a table that illustrates an example of the data structure of the user-job association table. As illustrated in FIG. 5, the user-job association table contains a user ID, print job ID, authorization ID, and the level of priority.

FIG. 6 is a table that illustrates an example of the data structure of the job table. As illustrated in FIG. 6, the job table contains a print job ID, job name, print data attribute, input user ID, the period of validity, and input time. The print data attribute represents the attribute, such as the type of print data. The user ID of a user who inputs print data is set under input user ID. FIG. 6 illustrates an example where the extension of the file of the print data is used as the print data attribute. The input time indicates the time and date when the print job was input.

The job managing unit 22 generates a job table in which the print job ID assigned to a received print job is associated with the attribute information (a job name, print data attribute, input user ID, the period of validity, input time, or the like) on the print job. The job managing unit 22 also generates a user-job association table in which, for example, the assigned print job ID is associated with the user ID (input user ID) of the user who input the print job, the authorization ID of the user, and the level of priority designated by the user.

As described above, according to the present embodiment, an explanation is given of an example where the table (management table) for managing jobs includes multiple tables (the user-job association table, the authorization table, the user table, and the job table). Because the management table includes these multiple tables, it is possible to promptly extract data, such as a print job ID, on the basis of a user ID.

Furthermore, in response to a request received from the image forming apparatus 3, the job managing unit 22 generates a job list in which a print job ID of each user is associated with output management information. The job managing unit 22 performs an operation to notify a user that there is a print job which is printable in accordance with the output management information and performs an operation to notify the user who transmitted a print job that printing has been performed (a notifying unit).

The job managing unit 22 notifies a user that there is a print job which is printable; and then, if printing has not been performed after a predetermined period of time (a first period) has elapsed, the job managing unit 22 notifies the user who transmitted the print job that printing has not been performed. If printing has not been performed after the notification was sent to the user who transmitted the print job and after a predetermined period of time (a second period) has elapsed, the job managing unit 22 performs a process of deleting the print job (a deleting unit).

The storage unit 23 stores therein a print job received by the job receiving unit 21.

Next, an explanation is given of the configuration of the image forming apparatus 3. The image forming apparatus 3 includes an authentication requesting unit 30, a job-list managing unit 31, a determining unit 32, a job acquiring unit 33, and a print output unit 34.

The authentication requesting unit 30 performs an operation to input user authentication information which is necessary for printing, and performs an operation to request authentication.

By using the user information on an authenticated user, the job-list managing unit 31 acquires, from the print server 2, a job list of the user for which printing can be performed (an acquiring unit) and performs a process of managing and displaying the acquired job list (a display control unit).

If the user inputs a print-out request for a selected print job, or if the job-list managing unit 31 acquires a job list, the determining unit 32 determines whether printing is allowable (or whether printing is to be performed) on the basis of the output management information in the job list. A configuration may be such that the determining unit 32 is included in the print server 2 and the image forming apparatus 3 requests the determining unit 32 of the print server 2 to perform an operation as necessary.

If the determining unit 32 determines that printing is allowable (or printing is to be performed), the job acquiring unit 33 acquires a print job which is to be printed out, from the storage unit 23 of the print server 2.

The print output unit 34 performs printing in accordance with the print job acquired by the job acquiring unit 33.

Next, an explanation is given of the configuration of the authentication server 4. The authentication server 4 includes an authenticating unit 40. The authenticating unit 40 performs authentication of received user authentication information and transmits the result of the authentication. Performing authentication means determining whether there is user authentication information that matches the received user authentication information in the list of user authentication information stored in a predetermined memory area (not illustrated) of the authentication server 4. If there is matching user authentication information, the authenticating unit 40 determines that the authentication is valid and, if there is no matching user authentication information, the authenticating unit 40 determines that the authentication is invalid. If the authentication is valid, the authenticating unit 40 transmits the result of the authentication indicating that the authentication is valid. If the authentication is invalid, the authenticating unit 40 transmits the result of the authentication indicating that the authentication is invalid.

Figure 7:
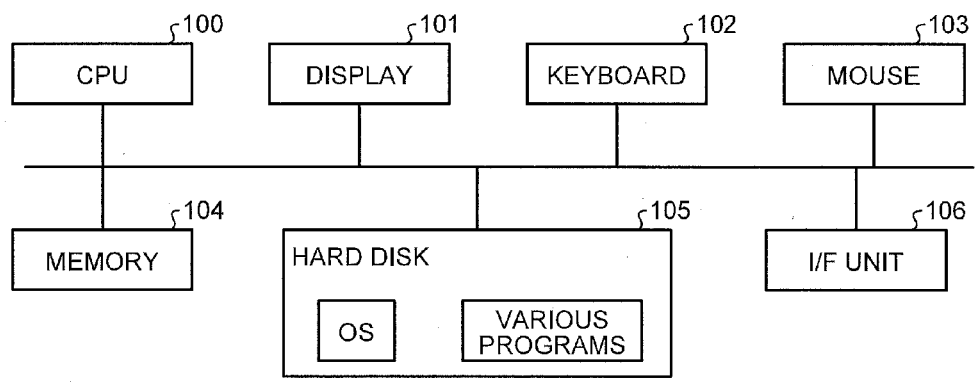
FIG. 7 is a diagram that illustrates an exemplary hardware configuration of a computer device.

The PC 1 and the print server 2 can be configured by using, for example, a known computer device. FIG. 7 is a diagram that illustrates an exemplary hardware configuration of a computer device that can be used as the PC 1 and the print server 2.

As illustrated in FIG. 7, the computer device includes a CPU 100, a display 101, a keyboard 102, a mouse 103, a memory 104, a hard disk 105, and an interface (I/F) unit 106 that are connected to one another via a data transmission path.

The CPU 100 controls the overall computer device. The keyboard 102 and the mouse 103 are used for inputting data or the like. The display 101 is configured by using a liquid crystal display panel, or the like, that displays data and the like. The hard disk 105 stores therein programs, data, and the like. The I/F unit 106 is an interface that connects to an external device, such as the print server 2.

In the PC 1, the CPU 100 reads programs that are stored on the hard disk 105 and that are related to an operating system (OS) so as to control the overall device. Furthermore, the CPU 100 reads various application programs stored on the hard disk 105 and performs an operation in accordance with each program. For example, if a document is generated by reading an application program related to document generation and a printing process is to be performed for the generated document, the CPU 100 reads a program stored on the hard disk 105 and performs a printing process.

In the print server 2, the CPU 100 reads a program relating to an OS so as to control the overall device and also reads a program stored on the hard disk 105 so as to perform the functions illustrated in FIG. 2. Such programs can be installed in a computer device and executed, and the programs can be provided by being pre-recorded in a recording medium.

Figure 8:
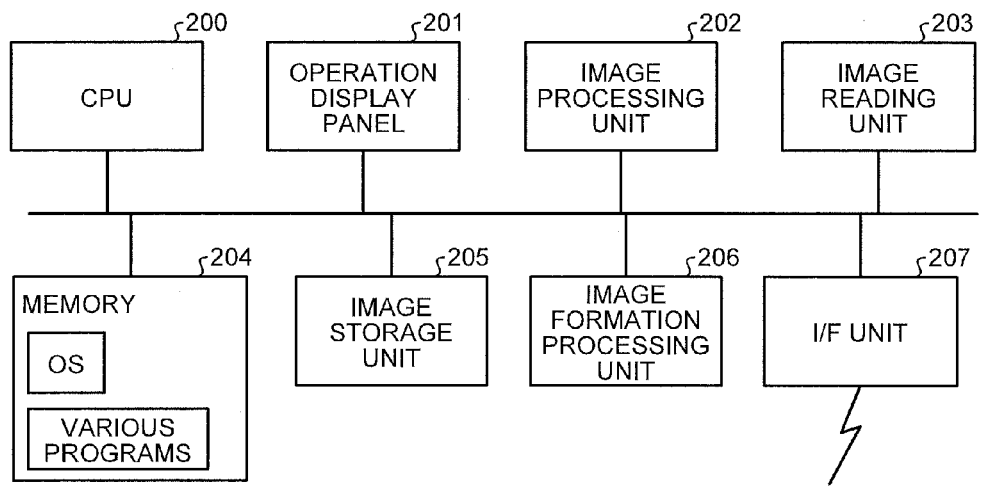
FIG. 8 is a diagram that illustrates an exemplary hardware configuration of an image forming apparatus.

FIG. 8 is a diagram that illustrates an exemplary hardware configuration of the image forming apparatus 3. The image forming apparatus 3 includes a CPU 200, an operation display panel 201, an image processing unit 202, an image reading unit 203, a memory 204, an image storage unit 205, an image formation processing unit 206, and an interface (I/F) unit 207, which are connected to one another via a data transmission path.

The CPU 200 controls the overall image forming apparatus 3. The operation display panel 201 functions as an interface through which information necessary for printing is input by a user's operation and functions as a display unit that displays various types of information. The operation display panel is configured as, for example, a touch panel.

The image processing unit 202 performs image processing on image data acquired from the image reading unit 203 such as a scanner, or image data transmitted from an external device. The memory 204 stores therein programs and data. The image storage unit 205 stores therein image data on which image processing has been performed and stores therein print data obtained from a print job. The image formation processing unit 206 outputs image data or print data. The I/F unit 207 is connected to an external device, such as the print server 2.

The CPU 200 reads a program relating to an OS which is stored in the memory 204 so as to control the overall image forming apparatus 3. Furthermore, the CPU 200 reads various application programs stored in the memory 204 so as to perform a process in accordance with each program. The CPU 200 reads programs stored in the memory 204 so as to perform the functions illustrated in FIG. 2. Such programs can be installed in the image forming apparatus 3 and executed; and the programs can be provided by being pre-recorded in a recording medium. In this example, the image forming apparatus 3 includes the image reading unit 203; however, the image forming apparatus 3 without the image reading unit 203 may be used.

FIG. 9 is a flowchart that illustrates an exemplary operation to transmit a print job from the PC 1 to the print server 2. In the PC 1, the display 101 first displays a login screen for user authentication (S100). FIG. 10 is a diagram that illustrates an exemplary login screen. As illustrated in FIG. 10, the PC 1 displays, for example, a login screen for inputting a login name (user ID) and a password, which are examples of user authentication information.

After the user inputs the user authentication information that is necessary for user authentication, the authentication requesting unit 10 of the PC 1 transmits the user authentication information to the print server 2 (S101). When the user authentication information is received, the user authenticating unit 20 of the print server 2 transmits the user authentication information to the authentication server 4 so as to request authentication (S102). The authenticating unit 40 of the authentication server 4 performs an authentication process on the received user authentication information (S103) and returns the result of the authentication to the print server 2 (S104). The user authenticating unit 20 of the print server 2 sends back the returned result of the authentication to the PC 1 (S105). When receiving the result of the authentication which indicates that the authentication is valid, the PC 1 proceeds to the subsequent process.

In the above-described authentication process, the PC 1 may directly transmit the user authentication information to the authentication server 4 without transmitting it via the print server 2 and directly receive the result of authentication from the authentication server 4.

When the user authentication process is completed, the PC 1 displays the setting screen on the display 101 (S106). The setting screen is a screen through which output management information is input. As described above, the output management information includes for example authorization information and priority information. FIG. 11 is a diagram that illustrates an exemplary setting screen.

A user ID, authorization information (printing authorization and deletion authorization), and the level of priority can be input through the setting screen. For example, the user ID of a user who requests a print job or the user ID of a different user is input under user ID. A configuration may be such that a group ID and a guest ID, which corresponds to a guest who is not registered in a user table, or the like, are input instead of the user IDs.

Under printing authorization, a setting is made as to whether authorization is granted to perform printing using a print job. Under deletion authorization, a setting is made as to whether authorization is granted to delete a print job. In the example illustrated in FIG. 11, the printing authorization and the deletion authorization are granted to the users whose user IDs are A1 and A3. Therefore, the users with the user IDs of A1 and A3 can process print information, for example, print out a print job and delete a print job.

Printing authorization is only granted to the user whose user ID is A2. Therefore, the user with the user ID of A2 can only print out a print job. The user with the user ID of A4, to whom neither the printing authorization nor the deletion authorization is granted, can only review print jobs. The user with the user ID of A5, to whom the printing authorization is not granted and only the deletion authorization is granted, can check and delete unnecessary print jobs like a system administrator does.

Thus, as authorization over a print job is granted with respect to each user, it is possible to precisely handle a request from a user who transmits a print job and it is possible to promptly delete a print job so that the leakage of information can be prevented before it occurs.

Moreover, the level of priority can be input through the setting screen. For example, as the level of priority is set to be higher, printing is performed with a higher priority. For example, a process is performed to display a print job at the top of the job list if its level of priority is high, and a process is performed to prevent printing of other print jobs until the printing is performed of a print job for which the level of priority is set to be higher than or equal to a predetermined threshold (e.g., if the level of priority is "highest" or greater than or equal to "high"). Furthermore, if the level of priority is set to be "highest", (1) the print job undergoes a forced printing or (2) a job selection screen is not displayed and a screen is displayed for direct inquiry as to whether the print job is to be output; thus, a process is performed to increase the level at which a forced printing takes place in accordance with the level of priority.

As the level of priority is set as described above, a user, who has priority to check the contents of a document, or the like, to be printed in accordance with a print job, can definitely recognize the print job. Especially, in the case of a highly-confidential document for which information leakage is an issue, it is possible to perform a process, such as promptly printing out a print job and deleting it.

An explanation is given again with reference to FIG. 5. The setting unit 11 sets the output management information, which is input by the user via the setting screen, as described above (S107). The job transmitting unit 12 generates a print job by using the job information, which includes the set output management information, the user information on the authenticated user, print setting information, and the like, and the print data (S108). The job transmitting unit 12 transmits the generated print job to the print server 2 (S109). The job receiving unit 21 of the print server 2 assigns a print job ID, which identifies a print job, to the print job transmitted from the PC 1. Furthermore, the job managing unit 22 generates a job table and a user-job association table in which the assigned print job ID is associated with job information, such as output management information (S110). The job receiving unit 21 stores the received print job in the storage unit 23 (S111).

Figure 12:
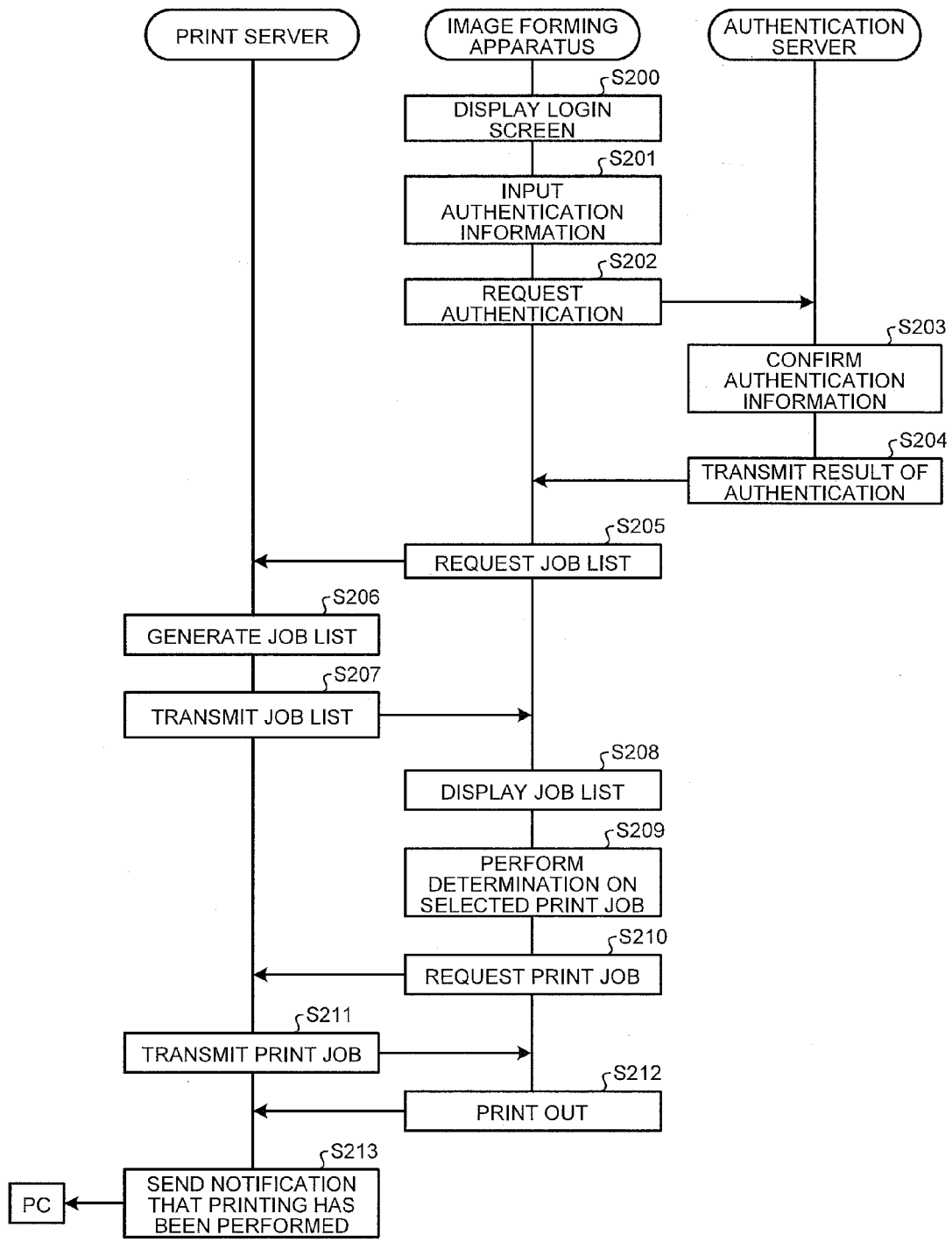
FIG. 12 is a flowchart that illustrates an exemplary process to print out a print job.

FIG. 12 is a flowchart that illustrates an exemplary process performed by the image forming apparatus 3 to print out a print job. In the image forming apparatus 3, the operation display panel 201 first displays a login screen through which a user inputs his/her user authentication information (S200). The operation display panel 201 displays, for example, the same login screen as that illustrated in FIG. 10.

When the user inputs user authentication information (a user name and password), which is necessary for user authentication, and then presses a login button, the image forming apparatus 3 receives an input of the user authentication information (S201). The authentication requesting unit 30 transmits the input user authentication information to the authentication server 4 and requests the authentication server 4 to perform an authentication process on the user authentication information (S202). The authenticating unit 40 of the authentication server 4 performs authentication by using the received user authentication information and the user authentication information stored by itself (S203). The authenticating unit 40 returns the result of the authentication to the image forming apparatus 3 (S204).

When the authentication requesting unit 30 of the image forming apparatus 3 receives the result of the authentication, which indicates that the authentication is valid, the job-list managing unit 31 transmits the authenticated user ID and requests the print server 2 to generate a job list corresponding to the user ID (S205).

When receiving the request for generating a job list, the job managing unit 22 of the print server 2 extracts the job information on the print job that is associated with the corresponding user ID by using the output management information so as to generate a job list (S206). For example, the job managing unit 22 acquires, from the user-job association table, the authorization information and the priority information that are associated with the user ID and the print job ID. The job managing unit 22 acquires, from the job table, the print job that is identified by using the acquired print job ID and generates a job list. The job managing unit 22 transmits the generated job list to the image forming apparatus 3 (S207).

The job-list managing unit 31 of the image forming apparatus 3 displays the received job list on the operation display panel 201 (S208). FIG. 13 is a diagram that illustrates an example of a displayed job list. In the example illustrated in FIG. 13, two print jobs are displayed in relation to the user whose user ID is A1. The presence or absence of the printing authorization and the deletion authorization is displayed with respect to each print job. Furthermore, the printing settings of each print job are displayed so that they can be checked. FIG. 13 illustrates an example where part of the information included in the generated job list is displayed; however, a configuration may be such that all of the information included in the job list is displayed or information other than the information illustrated in the example of FIG. 13 is displayed. For example, a configuration may be such that, other than the printing settings, output management information, such as the period of validity or the number of times printing can be performed, is displayed.

FIG. 14 is a diagram that illustrates another example of a displayed job list. FIG. 14 illustrates an exemplary job list that displays priority information that is assigned to print jobs. In FIG. 14, the job list is displayed with the jobs sorted in descending order of level of priority. For example, a process is performed such that, until a print job, for which the level of priority is set to be "highest", is selected and printed out, other print jobs cannot be selected.

If a user selects a desired print job from the displayed job list, the determining unit 32 determines whether the selected print job can be printed out on the basis of the output management information that is assigned to the print job (S209). If the printing authorization is not granted or if the level of priority of the selected print job is set to be other than "highest" and there is a print job, for which the level of priority is set to be "highest", among the unselected print jobs, the determining unit 32 displays a message screen that displays a message that the print job cannot be selected (cannot be printed). Thus, the determining unit 32 determines whether printing can be performed in accordance with the determination on the basis of the authorization to a selected print job and the determination on the basis of the level of priority of a print job included in a job list.

When printing can be performed, the job acquiring unit 33 requests the print server 2 to transmit the selected print job (S210) thereto.

The determining unit 32 displays a confirmation screen for a user to whom the deletion authorization is granted for the selected print job so as to confirm whether the print job is to be deleted after printing is performed. If the user makes an input that indicates the print job is to be deleted, the job acquiring unit 33 makes a request for transmission of the print job and also makes a request for deletion of the print job.

The print server 2 acquires the print job for which transmission has been requested from the storage unit 23, and then transmits it to the image forming apparatus 3 (S211). If a request for deletion has been made, the print server 2 performs a process for deleting the print job after the print job is transmitted.

The print output unit 34 of the image forming apparatus 3 performs printing in accordance with the received print job (S212). After transmitting the print job to the image forming apparatus 3, the print server 2 notifies the user, who transmitted the print job, that printing has been performed (S213).

If the process performed in accordance with the level of priority "highest" is forced printing, the determining unit 32 performs a determination when the image forming apparatus 3 acquires a job list at Step S207. At that time, the determining unit 32 determines whether there is a print job, for which the level of priority is set to be "highest", in the job list. If there is a print job for which the level of priority is "highest", the print job is automatically selected and the subsequent process from S210 to S212 is performed. During printing, the operation display panel may display a message, for example, "urgent print data is currently being printed".

As described above, if a user selects multiple print jobs, printing is performed according to the level of priority, other than according to the time when a print job is input. A configuration may be such that, for example, if a user issues a print command (presses a print button) without selecting any print job from the job list displayed on the operation display panel 201, the print jobs are printed out according to the times when the print jobs are input.

After printing is performed for all the print jobs which are included in the job list and for which the level of priority is set to be "highest", the job-list managing unit 31 deletes the print jobs for which printing has been performed from the job list and then displays the job list. Alternatively, the job-list managing unit 31 changes the level of priority of the print job for which printing has been performed to "medium" (or "high"), which is a lower level, in the output management information attached to the job list and then displays the job list. Furthermore, the job-list managing unit 31 changes the printing authorization of the print job for which printing has been performed to "x" so that printing cannot be performed and then displays the job list. The subsequent process is the same as the process from S209 to S213.

Figure 15:
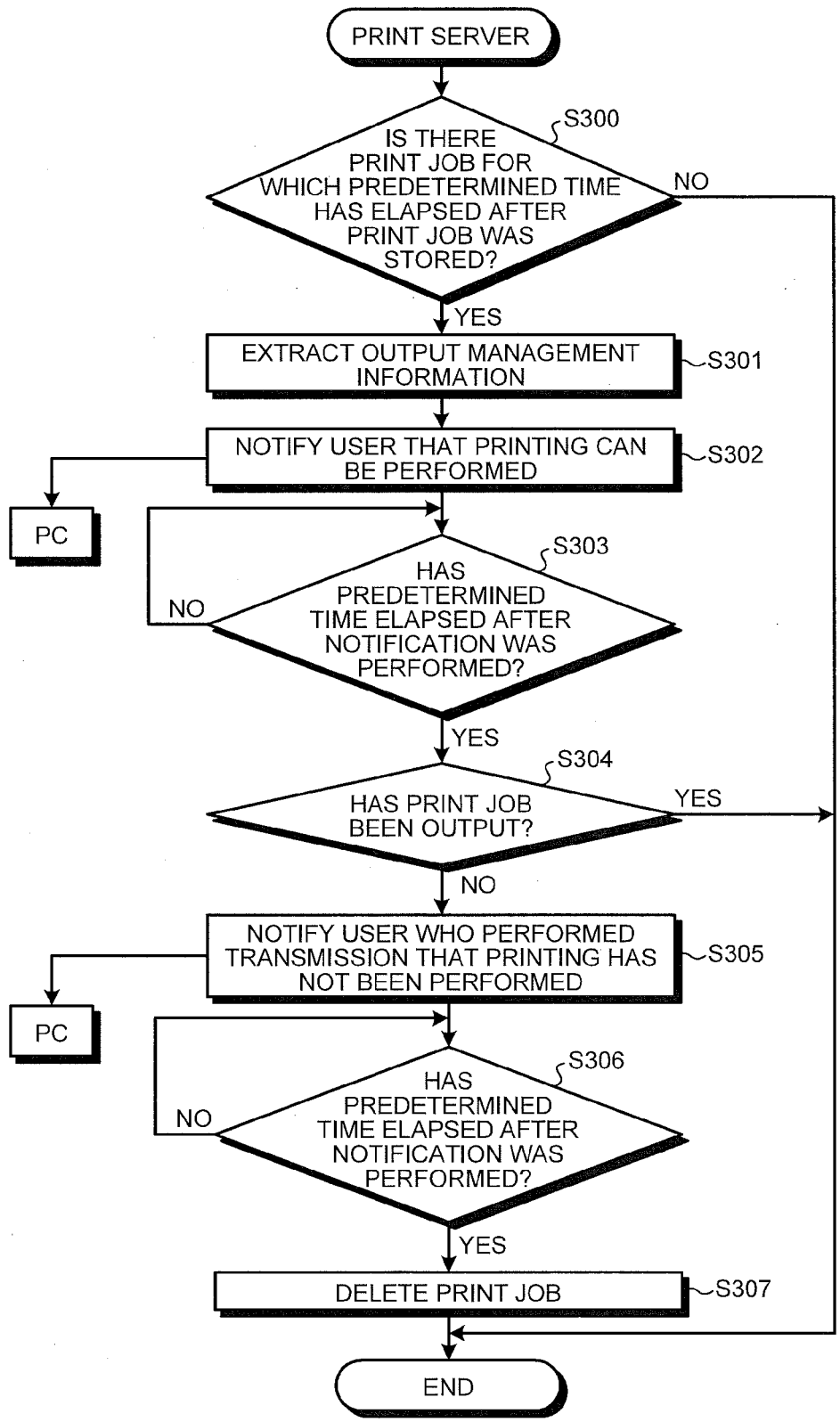
FIG. 15 is a flowchart that illustrates an exemplary notification process for a PC.

FIG. 15 is a flowchart that illustrates an exemplary notification process from the print server 2 to the PC 1.

The job managing unit 22 of the print server 2 checks whether there is an unprinted print job for which a predetermined time has elapsed after the print job was stored (S300). If there is no print job for which a predetermined time has elapsed (S300: No), the notification process is terminated.

If there is a print job for which a predetermined time has elapsed (S300: Yes), the job managing unit 22 extracts the output management information on the print job (S301). The job managing unit 22 refers to the extracted output management information and notifies a user who has printing authorization to print the print job or a user for whom the high level of priority is set that there is a print job for which printing can be performed (S302).

The job managing unit 22 further checks whether a predetermined period of time (a first period) has elapsed after notification was performed (S303). If the predetermined time has not elapsed (S303: No), a stand-by state continues until the predetermined time has elapsed. If the predetermined time has elapsed (S303: Yes), the job managing unit 22 checks whether the print job has been output after the predetermined time has elapsed (S304). If the print job has been output (S304: Yes), the notification process is terminated.

If the print job has not been output (S304: No), the job managing unit 22 notifies the user who transmitted the print job that the print job has not been printed out (S305). Thus, the user who transmitted a print job can recognize that printing has not been performed for the print job by, for example, another user to whom printing authorization is granted.

The job managing unit 22 further checks whether a predetermined period of time (a second time) has elapsed after notification was performed (S306). If the predetermined time has not elapsed (S306: No), a stand-by state continues until the predetermined time has elapsed. If the predetermined time has elapsed (S306: Yes), the job managing unit 22 performs a process of deleting the print job for which printing has not been performed (S307).

Destination information for identifying the PC 1 to which notification is sent is stored in a predetermined memory area in association with user information in advance, whereby the PC 1 can be identified by referring to the stored information. A configuration may be such that a user registers destination information when a print job is transmitted by the PC 1.

In the above-described example, after a print job is transmitted from the PC 1 to the print server 2 and temporarily stored in the storage unit 23, the print job is printed out by the image forming apparatus 3. A configuration may be such that selection is made so that print data is directly transmitted from the print server 2 to the PC of a user who has printing authorization without printing out the print job. In the explanation, output management information includes authorization information and priority information; however, the output management information may include any one of them.

Furthermore, in the above-described explanation, a user inputs the level of priority through the setting screen; however, a configuration may be such that the level of priority is dynamically changed in accordance with a pre-set condition. For example, a configuration may be such that the level of priority is set higher as the expiration of the period of validity approaches. Furthermore, a configuration may be such that the level of priority is changed in accordance with the authorization granted to a user. For example, a configuration may be such that the level of priority of a print job for a user who has printing authorization is set to be higher than that of a print job of a user who does not have printing authorization. A condition for changing the level of priority is not limited to those described above.

In the above-described explanation, the image forming apparatus 3 mainly performs a process according to the level of priority. A configuration may be such that the print server 2 performs all or some of a process according to the level of priority. For example, a configuration may be such that, after S207 illustrated in FIG. 12, the print server 2 transmits a request to the image forming apparatus 3 to perform forced printing of a print job for which the level of priority is "highest". In this case, for example, a configuration may be such that the print server 2 transmits a requested job list to the image forming apparatus 3 after printing is performed for the print job for which the level of priority is "highest".

The print server 2 may sort print jobs in descending order of the level of priority so as to generate a job list. A configuration may be such that the print server 2 does not sort print jobs in descending order of the level of priority when a job list is generated and, when the job list is displayed, the image forming apparatus 3 sorts the print jobs in accordance with the level of priority and displays them. Furthermore, a configuration may be such that, when the job list is displayed, the image forming apparatus 3 changes the display form of print jobs in accordance with the level of priority. For example, a configuration may be such that the image forming apparatus 3 highlights a print job that has a high priority or displays a print job other than the print job that has a high priority in a display form such that it cannot be selected.

According to an aspect of the present embodiment, it is possible to enhance information security during output of jobs and to output the jobs in accordance with the level of priority.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
    a memory unit storing instructions of at least one program; and
    a processor configured to execute the stored instructions, the stored instructions being instructions that, when executed by the processor, cause the processor to implement,
        an obtaining unit configured to obtain a user identification information;
        an acquiring unit configured to acquire a job list of jobs, each job including output target data being stored in a storage unit and being associated with the user identification information, an output priority information being set to each job;

an output unit configured to output the output target data of the job selected from the job list; and an output control unit configured to perform control so that a user identified by the user identification information is not able to request, through a job selection screen, outputting of the job to which the output priority information is not set as a preferentially-output job among the jobs included in the job list, until the output unit outputs the job to which the output priority information is set as the preferentially-output job, wherein, when an input user inputting a job sets another user as an output user to output the job, the job is stored in the storage unit so as to be associated with user identification information of the another user and output priority information of the job with respect to the another user, the acquiring unit acquires the job list of both of the job associated with the user identification obtained by the obtaining unit as the user identification information of the input user, and the job associated with the user identification information obtained by the obtaining unit as the user identification of the another user, and the output control unit performs control so that the user identified by the user identification information is not able to request, through the job selection screen, outputting of the job to which the output priority information is set as the preferentially-output job among the jobs included in the job list, until the output unit outputs the job for which the input user sets the another user as the output user and to which the output priority information is set as the preferentially-output job.

2. The information processing apparatus according to claim 1, wherein when the job to which the output priority information is set as preferentially-output job is found in the job list, before the job selection screen is displayed on a display unit, the output control unit controls the output unit to output the job thus found.

3. The information processing apparatus according to claim 1, further comprising:

a changing unit configured to change, when the job set as the preferentially-output job has been output, the output priority information of the output job so as to be set as a job other than the preferentially-output job, wherein the output priority information includes at least first information indicating whether the job is to be preferentially output ting and second information indicating whether the job is to be preferentially displayed on the display unit, and the changing unit changes at least one of the first information and the second information of the output priority information of the output job.

4. The information processing apparatus according to claim 1, wherein when the input user inputting the job sets the another user as the output user to output the job and makes a setting as to whether deletion authorization to delete the job is assigned to the another user, the job is stored in the storage unit so as to be associated with the user identification information of the another user, the output priority information of the job with respect to the another user, and the deletion authorization information, and the another user to whom the deletion authorization is not assigned by the input user is not able to instruct deletion of the job.

5. An information processing apparatus comprising:
a memory unit storing instructions of at least one program; and a processor configured to execute the stored instructions, the stored instructions being instructions that, when executed by the processor, cause the processor to implement, an obtaining unit configured to obtain an user identification information;

an acquiring unit configured to acquire a job list of jobs, each job including output target data being stored in a storage unit and being associated with the user identification information, an output priority information being set to each job;

an output unit configured to output the output target data of the job selected from the job list;

a display unit configured to display a screen for asking a user whether the output unit is to output the job to which the output priority information is set as a preferentially-output job, and an output control unit configured to whether the output unit is to output the job to which the output priority perform control so that a user identified by the user identification information is not able to request, through a job screen, outputting of the job to which the output priority information is not set as a preferentially-output job among the jobs included in the job list, until the screen for asking is displayed, wherein, when an input user inputting a job sets another user as an output user to output the job, the job is stored in the storage unit so as to be associated with user identification information of the another user and output priority information of the job with respect to the another user, the acquiring unit acquires the job list of both of the job associated with the user identification obtained by the obtaining unit as the user identification information of the input user, and the job associated with the user identification information obtained by the obtaining unit as the user identification of the another user, and the display unit displays, on the display unit, a screen for asking whether the output unit is to output the job for which the input user sets the another user as the output user and to which the output priority information is set as the preferentially-output job among the jobs included in the job list.

6. The information processing apparatus according to claim 5, wherein the output control unit is configured to control to display the job selection screen on the display unit, after the user selects whether to output the job through the screen for asking.

7. The information processing apparatus according to claim 5, further comprising:

a changing unit configured to change, when the job set as the preferentially-output job has been output, the output priority information of the output job so as to be set as a job other than the preferentially-output job, wherein the output priority information includes at least first information indicating whether the job is to be preferentially output ting and second information indicating whether the job is to be preferentially displayed on the display unit, and the changing unit changes at least one of the first information and the second information of the output priority information of the output job.

8. The information processing apparatus according to claim 5, wherein when the input user inputting the job sets the another user as the output user to output the job and makes a setting as to whether deletion authorization to delete the job is assigned to the another user, the job is stored in the storage unit so as to be associated with the user identification information of the another user, the output priority information of the job with respect to the another user, and the deletion authorization information, and the another user to whom the deletion authorization is not assigned by the input user is not able to instruct deletion of the job.

9. An information processing method comprising:

obtaining an user identification information;

acquiring a job list of jobs, each job including output target data being stored in a storage unit and being associated with the user identification information, an output priority information being set to each job;

outputting the output target data of the job selected from the job list;

displaying a screen for asking a user whether the output unit is to output the job to which the output priority information is set as a preferentially-output job; and performing control so that a user identified by the user identification information is not able to request, through a job screen, outputting of the job to which the output priority information is not set as a preferentially-output job among the jobs included in the job list, until the screen for asking is displayed, wherein, when an input user inputting a job sets another user as an output user to output the job, the job is stored in the storage unit so as to be associated with user identification information of the another user and output priority information of the job with respect to the another user, the acquiring includes acquiring the job list of both of the job associated with the user identification obtained as the user identification information of the input user, and the job associated with the user identification information obtained as the user identification of the another user, and the displaying a screen includes displaying a screen for asking whether the output unit is to output the job for which the input user sets the another user as the output user and to which the output priority information is set as the preferentially-output job among the jobs included in the job list.

10. The information processing method according to claim 9, further comprising:

controlling to display the job selection screen on the display unit, after the user selects whether to output the job through the screen for asking.

11. The information processing method according to claim 9, further comprising:

changing, when the job set as the preferentially-output job has been output, the output priority information of the output job so as to be set as a job other than the preferentially-output job, wherein the output priority information includes at least first information indicating whether the job is to be preferentially output ting and second information indicating whether the job is to be preferentially displayed on the display unit, and the changing includes changing at least one of the first information and the second information of the output priority information of the output job.

12. The information processing method according to claim 9, wherein, when the input user inputting the job sets the another user as the output user to output the job and makes a setting as to whether deletion authorization to delete the job is assigned to the another user, the job is stored in the storage unit so as to be associated with the user identification information of the another user, the output priority information of the job with respect to the another user, and the deletion authorization information, and the another user to whom the deletion authorization is not assigned by the input user is not able to instruct deletion of the job.

\* \* \* \* \*